Nov. 20, 1934.  S. E. SEVERTSON  1,981,393
COVERING ATTACHMENT FOR PLANTERS
Filed April 28, 1934
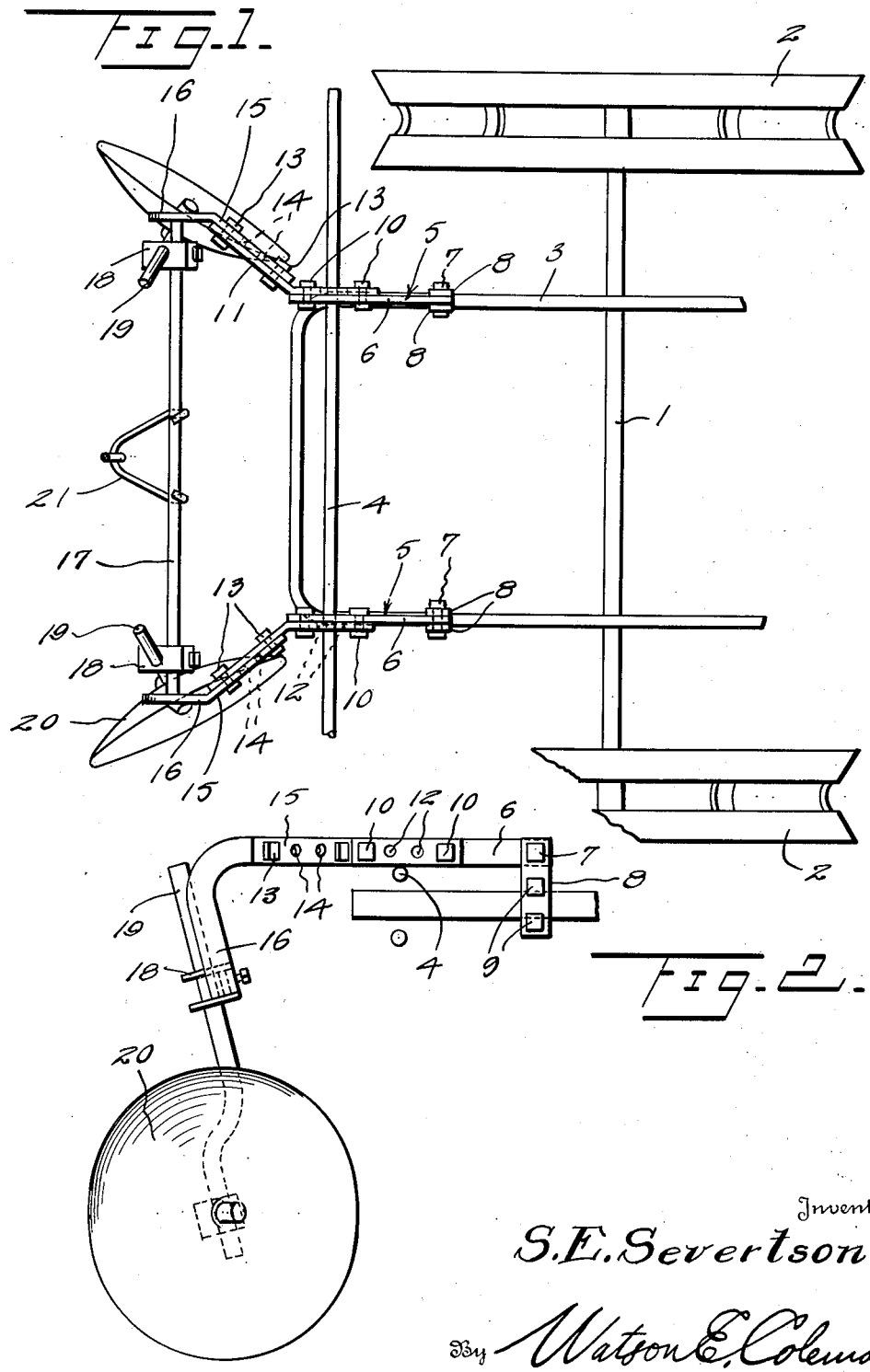
Inventor
S. E. Severtson
By Watson E. Coleman
Attorney Patented Nov. 20, 1934

1,981,393

UNITED STATES PATENT OFFICE 1,981,393

COVERING ATTACHMENT FOR PLANTERS

Sigmund E. Severtson, Kenneth, Minn.

Application April 28, 1934, Serial No. 722,990

2 Claims. (Cl. 97—56)

This invention relates to improvements in agricultural implements and pertains particularly to a seed planter attachment.

The primary object of the present invention is to provide a device which may be readily attached to the ordinary corn planter without making any alterations whatever in the construction of the same or removing any parts thereof, which operates to cover the deposited seed so that it cannot be picked up by birds or will not be washed from place by rains.

Another object of the invention is to provide a seeded row covering attachment for a corn planter of novel construction permitting its ready adjustment relative to the planter so as to change the positions of the covering disks longitudinally of the machine and also laterally thereof.

Still another object of the invention is to provide an attachment for a corn planter by which the seeded row may be readily covered, which is adapted to be attached to the planter in such a manner as to permit the adjustment of the attachment in a vertical plane.

The invention will be best understood from a consideration of the following detailed description taken in connection with the accompanying drawing forming part of this specification, with the understanding, however, that the invention is not confined to any strict conformity with the showing of the drawing but may be changed or modified so long as such changes or modifications mark no material departure from the salient features of the invention as expressed in the appended claims.

In the drawing:—

Figure 1 is a view in top plan of the attachment comprising the present invention, showing the same applied to the rear portion of a planter.

Figure 2 is a view in side elevation of the attachment.

The drawing shows a portion of the rear of a corn planter of ordinary design. Since the construction of such planters is well known, only so much of the same has been shown as is necessary to illustrate the manner in which the present attachment is applied. In the portion of the planter structure which has been shown, the numeral 1 indicates the axle upon which the supporting wheels 2 are mounted and over and on which the machine frame 3 is mounted and the numeral 4 indicates one of the usual two transverse bars secured across the rear of the frame 3 for the support at their outer ends of marker rods (not shown).

The planter attachment embodying the present invention comprises two side units, each of which is indicated by the numeral 5, and each of these units consists of a straight bar 6, one end of which is secured by means of bolts 7 between the ends of a pair of short links each of which is indicated by the numeral 8. The bolt 7 forms a pivotal connection for the attached bar 6 and beneath this bolt are two bolts, each of which is indicated by the numeral 9, which pass transversely through the links 8 at the top and bottom edges of a side bar of the planter frame 3, thus forming a rigid clamp on the frame to which the bar 6 of a unit 5 is pivotally connected.

Each of the bars 6 has extending therethrough adjacent its outer or rear end the pair of bolts 10, and these bolts secure to the bar one arm of the obliquely angled bar 11. The arm of the bar 11 through which the bolts pass, is provided with a series of apertures 12 so that it may be longitudinally adjusted upon the bar 6. It will thus be seen that one arm of each of the angled bars 11 is secured to extend in a line paralleling the path of travel of the planter, and the other arm extends obliquely from the bar 6 and outwardly with respect to the planter. The outwardly extending ends of the bars 11 carry bolts 13 which pass through apertures 14 in the angularly directed extensions 15 of the upper ends of the hanger arms 16.

Extending between and connecting the lower ends of the hanger arms 16 is a cross bar 17 and mounted upon this bar is a pair of clamps 18, each of which secures a vertically adjustable post 19 to the lower end of which is rotatably attached a disk 20.

Intermediate the ends of the bar 17 is connected a yoke 21 to which a connection may be made by a rope or chain to facilitate the operator of the planter raising or lowering the attachment on the pivot bolts 7, as required.

By the foregoing arrangement of parts, it will be seen that longitudinal adjustment of the disks with respect to the planter may be readily made and also that the distance between the disks may be varied, as desired, according to the distance between the rows being planted, by adjustment of the clamps 18 upon the shaft 17.

From the foregoing, it will be readily apparent that a planter having the present attachment connected therewith will function to cover a planted row so that it will not be necessary to later go over the ground and cover up the seeds. By covering the seeds immediately, they are protected from drying out, from birds, and will not be washed from place in the event of rainfall before they are covered.

As will be readily apparent, the longitudinal and lateral adjustments of the units 5 facilitate the lengthening of the device to adapt it to different sized planters and also to relatively locate the covering disks to suit the width of the row which is being planted.

What is claimed is:—

1. A covering device for attachment to corn planters having side frame beams, comprising a pair of bars, pivotal connecting means between an end of each of said bars and a side beam of the frame, a pair of angular bars each having two angularly related portions, each of said angular bars having one portion secured against the side of a first mentioned bar for adjustment longitudinally of the same and having its other portion extending laterally from the planter, a pair of hanger units each terminating at its upper end in an angularly directed terminus disposed against one side of the laterally directed portion of the adjacent angle bar, means coupling the said laterally directed portions of the angular bars with the adjacent hanger extensions, a bar extending transversely of and connecting the lower ends of said hanger units, a pair of clamps carried upon said last bar, a vertical shaft secured to the last bar by each of said clamps, and a disk rotatably mounted upon the lower end of each of said vertical shafts and disposed obliquely of the path of travel of the planter.

2. A covering device for attachment to a corn planter having side frame beams and a transverse marker rod carrying bar, comprising a pair of plates carried by each side beam with the side beam secured therebetween and the plates extending in spaced relation above the same, a pair of bars each having one end disposed between a pair of plates and pivotally secured to the same and extending across and resting on said marker rod supporting bar, a rearwardly and laterally extending bracket secured to each of said plate attached bars for adjustment on and longitudinally of the same, a hanger bar secured to each of said brackets, a bar extending transversely of and secured at its ends to the hanger bars, a pair of clamps adjustably secured on said last mentioned bar, an earth working element connected with each of said clamps, and means attached to the clamp supporting bar for raising or lowering the latter.

SIGMUND E. SEVERTSON.